US009260302B2

(12) United States Patent
Van Dijk et al.

(10) Patent No.: US 9,260,302 B2
(45) Date of Patent: Feb. 16, 2016

(54) WATER GAS SHIFT PROCESS

(71) Applicant: Stichting Energieonderzoek Centrum Nederland, Petten (NL)

(72) Inventors: Hendricus Adrianus Johannes Van Dijk, Petten (NL); Paul Dean Cobden, Petten (NL); Stéphane Walspurger, Petten (NL); Jan Wilco Dijkstra, Petten (NL)

(73) Assignee: Stichting Energieonderzoek Centrum Nederland, Petten (NL)

( * ) Notice: Subject to any disclaimer, the term of this patent is extended or adjusted under 35 U.S.C. 154(b) by 0 days.

(21) Appl. No.: 14/379,039

(22) PCT Filed: Feb. 15, 2013

(86) PCT No.: PCT/NL2013/050095
§ 371 (c)(1),
(2) Date: Aug. 15, 2014

(87) PCT Pub. No.: WO2013/122467
PCT Pub. Date: Aug. 22, 2013

(65) Prior Publication Data
US 2015/0014595 A1    Jan. 15, 2015

(30) Foreign Application Priority Data
Feb. 17, 2012   (NL) .................................... 2008313

(51) Int. Cl.
*C01B 3/16*    (2006.01)
*C01B 3/12*    (2006.01)
*C01B 3/56*    (2006.01)

(52) U.S. Cl.
CPC ... *C01B 3/16* (2013.01); *C01B 3/12* (2013.01); *C01B 3/56* (2013.01);
(Continued)

(58) Field of Classification Search
CPC ................... C01B 2203/043; C01B 2203/063; C01B 3/56; C01B 2203/1258; C01B 2203/0283; C01B 3/12; C01B 3/16; C01B 2203/062; C01B 2203/0475; C01B 2203/061; C01B 2203/0485; C01B 2203/0425; C01B 2203/1205; C01B 2203/1264
See application file for complete search history.

(56) References Cited

U.S. PATENT DOCUMENTS

| 4,002,720 A | 1/1977 | Wheelock et al. |
| 4,536,382 A | 8/1985 | Blytas |

(Continued)

FOREIGN PATENT DOCUMENTS

| EP | 1 413 546 A1 | 4/2004 |
| EP | 2 141 118    | 1/2010 |

(Continued)

OTHER PUBLICATIONS

International Search Report of PCT/NL2013/050095 mailed May 7, 2013.
(Continued)

*Primary Examiner* — Stanley Silverman
*Assistant Examiner* — Syed Iqbal
(74) *Attorney, Agent, or Firm* — Sunit Talapatra; Foley & Lardner LLP

(57) ABSTRACT

High-pressure steam supply in hydrogen production process is made more efficient by water gas shift process which comprises, in alternating sequence: (a) a reaction stage wherein a feed gas comprising CO and $H_2O$ is fed into a water gas shift reactor containing a sorbent material capable of adsorbing $H_2O$ and $CO_2$ and wherein a product gas issuing from the reactor is collected, (b) a regeneration stage wherein $CO_2$ is removed from the reactor, (c) a loading stage, wherein $H_2O$ is fed into the reactor; wherein said feed gas mixture has a molar ratio of $H_2O$ to CO below 1.2, and the loading stage is performed at a lower pressure than the pressure of the reaction stage.

20 Claims, 6 Drawing Sheets

(52) U.S. Cl.
CPC .. *C01B 2203/0283* (2013.01); *C01B 2203/043* (2013.01); *C01B 2203/0425* (2013.01); *C01B 2203/0475* (2013.01); *C01B 2203/0485* (2013.01); *C01B 2203/061* (2013.01); *C01B 2203/062* (2013.01); *C01B 2203/063* (2013.01); *C01B 2203/1205* (2013.01); *C01B 2203/1258* (2013.01); *C01B 2203/1264* (2013.01)

(56) References Cited

U.S. PATENT DOCUMENTS

| | | | |
|---|---|---|---|
| 5,358,701 | A | 10/1994 | Pinnavaia et al. |
| 6,245,221 | B1 | 6/2001 | Baird et al. |
| 6,322,612 | B1 | 11/2001 | Sircar et al. |
| 7,354,562 | B2 | 4/2008 | Ying et al. |
| 8,617,499 | B1 * | 12/2013 | Siriwardane et al. ......... 423/225 |
| 2004/0081614 | A1 | 4/2004 | Ying et al. |
| 2007/0178035 | A1 | 8/2007 | White et al. |
| 2011/0293509 | A1 | 12/2011 | Cobden et al. |

FOREIGN PATENT DOCUMENTS

| | | |
|---|---|---|
| WO | WO-03/020406 A2 | 3/2003 |
| WO | WO-2005/102916 A2 | 11/2005 |
| WO | WO-2008/068305 A2 | 6/2008 |
| WO | WO 2009058584 A2 * | 5/2009 |
| WO | WO-2010/000387 | 1/2010 |
| WO | WO-2010/059052 | 5/2010 |
| WO | WO-2010/059055 A1 | 5/2010 |
| WO | WO-2011/000792 | 1/2011 |

OTHER PUBLICATIONS

Jang, H.M. et al., "High-purity hydrogen production through sorption enhanced water gas shift reaction using K2CO3-promoted hydrotalcite", Chemical Engineering Science, vol. 73, Feb. 16, 2012, pp. 431-438.

Van Dijk, H.A.J. et al., "Testing of hydrotalcite-based sorbents for CO2 and H2S capture for use in sorption enhanced water gas shift", International Journal of Greenhouse Gas Control, Elsevier Ltd., GB, vol. 5, No. 3, Apr. 17, 2010, pp. 505-511.

Wright A.D., "CAESAR: Modelling of the Sorption-Enhanced Water Gas Shift process for pre-combusion CO2 Capture", Third European Conference on CCS Research, Development and Demonstration, May 25, 2011.

Wright, A.D. et al., "CAESAR: Development of a SEWGS model for IGCC", Energy Procedia, vol. 4, 2011, pp. 1147-1154.

Descamps, et al., "Efficiency of an Integrated Gasification Combined Cycle (IGCC)power plant including CO2 removal", Energy 33 (2008)874-881, XP022634870.

Ko, et al., "A study of Zn—Mn based sorbent for the high temperature removal of H2S from coal-derived gas", Journal of Hazardous Materials, 147 (2007) 334-341, XP002538496.

Maurstad, O. et al. "Impact of coal quality and gasifier technology on IGCC performance", 8th International Conference on Greenhouse Gas Control Technology, Trondheim, 2006 (Abstract).

Wakker, et al., "High Temperature H2S and COS Removal with MnO and FeO on gamma-Al2O3 Acceptors", Ind. Eng. Chem. Res. vol. 32, No. 1, 139-149, Jan. 1993, XP002538496.

International Search Report issued in International Patent Application No. PCT/NL2009/050709 mailed Jan. 26, 2010.

\* cited by examiner

WATER GAS SHIFT PROCESS

CROSS-REFERENCE TO RELATED APPLICATIONS

This application is the National Phase of International Patent Application No. PCT/NL2013/050095, filed Feb. 15, 2013, published as WO 2013/122467, which claims priority to Netherlands Application No. 2008313, filed Feb. 17, 2012. The contents of these applications are herein incorporated by reference in their entirety.

FIELD OF THE INVENTION

The invention is in the field of processing syngas for reducing its carbon content and increasing its hydrogen content by water gas shift (WGS) processes.

BACKGROUND OF THE INVENTION

The water gas shift (WGS) reaction, which can be represented by the equation $CO+H_2O \rightarrow CO_2+H_2$, is a powerful tool for efficiently producing hydrogen-containing product gases from carbonaceous sources. Typically a feed containing carbon monoxide obtained for instance from gasification (partial combustion) of coal or biomass, and water (steam) is fed into a WGS reactor to obtain a mixture of hydrogen and other components, including carbon dioxide. Alternatively, methane can be used as a source of CO-containing gas for a WGS process, either by catalytic partial oxidation (CPO) according to the equation: $CH_4+\frac{1}{2}O_2 \rightarrow CO+2H_2$ or by steam reforming according to the equation: $CH_4+H_2O \rightarrow CO+3H_2$, or by mixed modes thereof.

For a maximum conversion to hydrogen, an excess of water is required, and therefore conventional WGS processes use a $H_2O$:CO molar feed ratio of well over 1, typically around 2 or higher. Removal of $CO_2$ during or after the WGS reaction then results in a high purity hydrogen product. Conventionally, pure $H_2$ is obtained by removal, not only of $CO_2$, but also CO, $CH_4$ and $N_2$ via e.g. PSA. In the conventional process, CO is also present due to the thermodynamically limited CO conversion.

WO 2010/059052 and Van Dijk et al., *Intern. J. Greenhouse Gas Control*, 5 (2011), 505-511), describe a sorption-enhanced water gas shift (SEWGS) process to produce hydrogen and carbon dioxide as well as hydrogen sulphide, wherein the carbon dioxide and hydrogen sulphide are adsorbed onto an alkali promoted hydrotalcite adsorbent. The carbon dioxide and hydrogen sulphide are subsequently simultaneously removed from the adsorbent.

WGS processes are typically carried out at high pressures and at relatively high temperatures (200-600° C.). The supply of high-pressure steam is relatively expensive and detracts from the total process efficiency. This is particularly relevant for CPO (catalytic partial oxidation) and gasification feeds, since these feeds do not contain sufficient steam. Therefore there is a case for lowering the level of steam in a WGS feed, while retaining high conversion levels of CO to $H_2$.

WO 2011/000792 (Shell) discloses a process for producing hydrogen-rich gas mixtures involving a WGS reaction wherein a low $H_2O$/CO molar ratio of 0.2-0.9 is used in the feed mixture. As a result of this low molar ratio, the gas issuing from the WGS reactor still has a high CO content and a low $H_2$/CO molar ratio of less than 1. This problem is overcome according to WO 2001/000792 by using multiple WGS reactors in series, wherein steam is added before each subsequent reactor. The WGS reaction proceeds at relatively low feed temperatures (190-230° C.) and requires high levels of hydrogen sulphide in the order of 2000 ppm in order to keep the WGS catalyst (Mo/Co-based) active. The $H_2S$ and the $CO_2$ have to be removed downstream e.g. by washing with a polyethylene glycol ether. This is one of the downsides of the process of WO 2010/000792, together with the fact that, in accumulation, still about a stoichiometric amount of high pressure steam with respect to the amount of CO has to be supplied.

WO 2010/000387 (Haldor Topsøe) also deals with the problem of the high-pressure steam requirement, while avoiding methanation reactions, in high feed temperature (about 390° C.) WGS reactions. The solution proposed by WO 2010/000387 is to use an alkali-promoted zinc/alumina catalyst for the WGS reaction, as further detailed in co-pending EP 2141118. Although the catalyst stability appeared to be satisfactory, and the methanation appeared to be suppressed, no solution is provided for reaching satisfactory CO conversion levels while operating with reduced steam feeds.

Wright et al. (*Energy Procedia*, 4 (2011) 1147) describe the role of steam in the purging and rinsing of a SEWGS process using a steam/CO molar ratio of 1.6.

Jang et al. (*Chem. Engineering Sc.* 73 (2012) 431) describe a SEWGS process using a steam/CO molar ratio of 5. Using a theoretical model, they conclude that the optimum hydrogen production is achieved for the hydrogen production in a SEWGS process since the WGS reaction, and thus $CO_2$ separation, are suppressed.

SUMMARY OF THE INVENTION

The invention pertains to an economically and technically improved process for producing hydrogen by reduction of water (steam) using carbon monoxide (CO), which requires lower amounts of high-pressure steam as input than conventional water gas shift (WGS) reactions. In addition to saving on high-pressure steam supplies, it was found that using low steam to CO ratios, a higher sorbent capacity and thus a higher hydrogen production efficiency can be achieved.

The process of the invention involves loading the adsorbent used for promoting the WGS reaction with steam prior to a next cycle of the WGS reaction. The steam loading can be performed together with desorbing carbon dioxide ($CO_2$) from the adsorbent so as to regenerate the adsorbent, or immediately after this desorption step. The steam loading step is performed at a substantially lower pressure than the WGS reaction step.

The hydrogen-rich product gas can be tuned to the desired composition for the purpose of combustion, or for the purpose of synthesising chemicals, and can even be free of CO, $CO_2$ and $H_2S$ or other acidic impurities as required. As a result, the process can lead to upgrading of steam, better cost-efficiency, and higher conversion rates.

DETAILED DESCRIPTION OF THE INVENTION

Figure 1:
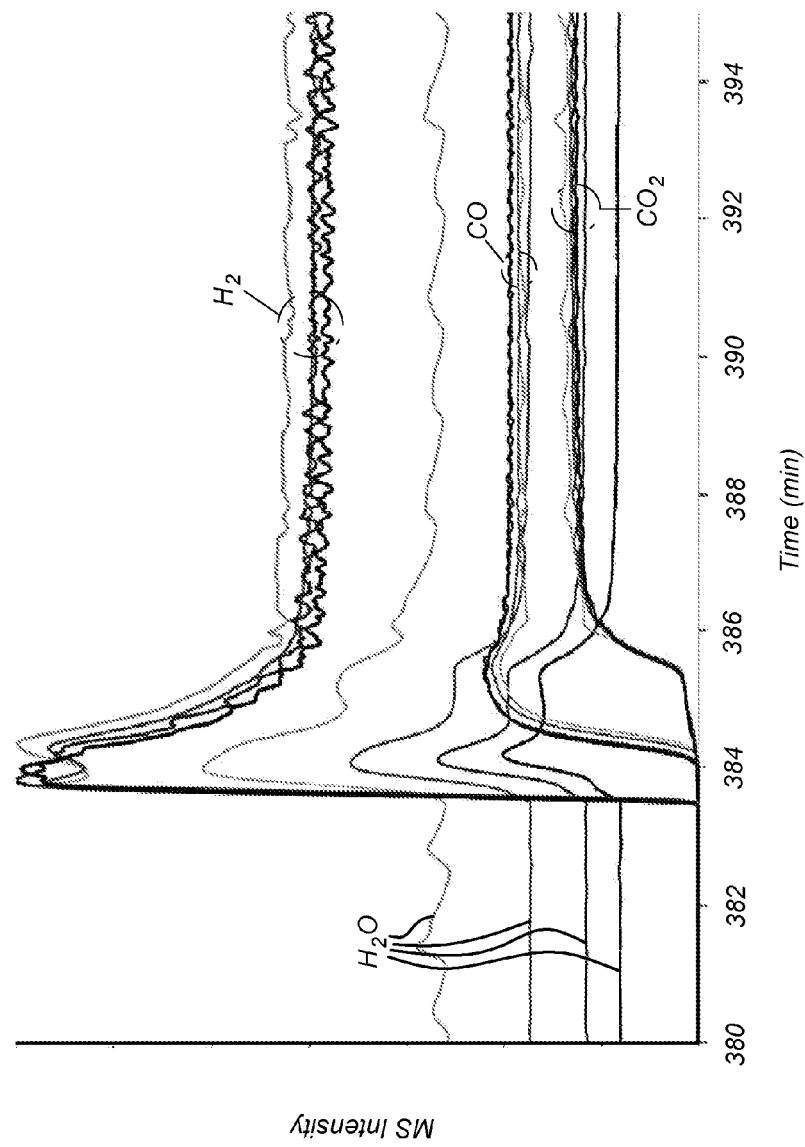
FIG. 1 shows a syngas mixture having the composition as given in Table 1. The black lines represent the steam/CO molar ratio of ½, the lighter the lines, the higher the steam/CO molar ratios: ⅔, 1/1, 3/2. H2: first to rise, highest line, CO: second to rise (breakthrough), middle line, CO2: last to rise, lowest line.

The invention concerns a water gas shift process comprising: (a) a reaction stage wherein a feed gas comprising CO and $H_2O$ is fed into a water gas shift reactor containing a sorbent material capable of adsorbing $H_2O$ and $CO_2$ and wherein a product gas issuing from the reactor is collected, (b) a regeneration stage wherein $CO_2$ is removed from the reactor, and (c) a loading stage, wherein $H_2O$ is fed into the reactor, said loading stage coinciding with or following said regeneration stage (b). The reaction stage and regeneration and loading stages are performed in alternating sequence, wherein said feed gas mixture has a molar ratio of $H_2O$ to CO of below 1.2. The loading stage is preferably performed at a lower pressure than the reaction stage.

In the present invention, a water gas shift reaction is a reaction wherein water is decomposed in the presence of carbon monoxide (CO) to produce hydrogen or another hydrogen-containing gas. In particular, the reaction can be represented by the equation: $CO+H_2O\rightarrow CO_2+H_2$. The reaction is shifted to right-hand side (hydrogen) as a result of adsorption of the $CO_2$ product.

In preferred embodiments, the desired product gas of the reaction stage comprises hydrogen and the hydrogen concentration of the desired gas is higher than the hydrogen concentration of the feed gas. Similarly, the level of CO and $CO_2$ in the desired gas is lower than their levels in the feed gas.

In the process of the invention, the feed gas mixture has a molar ratio of $H_2O$ to CO of up to 1.2, exceptionally up to about 1.5, or up to 2.0 for specific embodiments. A preferred feed gas for the process of the invention is a syngas or similar gas mixture which gas contains 5-30 vol. %, especially 10-25 vol. % CO, 5-30 vol. %, especially 8-24 vol. % $CO_2$, 0-50 vol. %, especially 2-40 vol. % $H_2$ and 0-25 vol. %, especially 6-18 vol. % $H_2O$. For a (relatively) dry feed gas, a preferred ratio is 5-65 vol. %, especially 10-40 vol. % CO, 5-50 vol. %, especially 8-30 vol. % $CO_2$, 0-50 vol. %, especially 2-40 vol. % $H_2$ and 0-6 vol. %, especially 0-4 vol. % $H_2O$. The remainder may be minor components such as $H_2S$, and inert gases and trace components. Although WGS feed gas mixtures obtained by steam reforming of carbon sources, which contain appreciable levels of residual steam, can also be used in the process of the invention, the advantages of the invention, i.e. saving on expensive high-pressure steam, are less pronounced, and thus the preference is for feed gas mixtures obtained by partial oxidation of carbon sources (syngas).

The feed gas may contain gas issuing from a preceding water gas shift reactor. In that case, it will already contain appreciable levels of hydrogen. Further components are then added, including steam if necessary, while ensuring a molar ratio of $H_2O$ to CO below 1.2.

A preferred molar ratio of $H_2O$ to CO in the feed gas is from 0 up to 1.0, more preferred from 0 up to 0.9 even more preferred up to 0.8, or from 0 up to 0.75, most preferred up to 0.5. Complete absence of $H_2O$ in the feed gas ($H_2O/CO=0$), was found to be quite feasible as well. Other preferred molar ratios are 0.1 up to 0.9, most preferred 0.25-0.75. If the product gas is used for combustion, the feed gas mixture may have a relatively high molar ratio of $H_2O$ to CO of 0.5-1.2. In case the product gas is used for producing chemicals such as methane, methanol and higher hydrocarbons, such as in Fischer-Tropsch synthesis, the feed gas mixture may advantageously have a lower molar ratio of $H_2O$ to CO of e.g. below 0.8.

The composition of the regeneration gas depends on whether the regeneration stage and the loading stage are performed simultaneously or consecutively. If recovery of residual $CO_2$ is not of a special concern, regeneration (purging) can be done using a gas which is low in steam, such as nitrogen, air or even exhaust gas, while carrying off the $CO_2$ with the spent air, and $H_2O$ is loaded in a following, separate, loading step. If, on the other hand, recovery of residual $CO_2$ is important, then purging is preferably effected with a gas which is rich in steam, and purging and loading can be simultaneous. If the regeneration and the loading are performed at the same time, i.e. in a single process step, the regeneration gas should contain sufficient steam to load the adsorbent with water under the process conditions, while the level of $CO_2$ should be sufficiently low to effectively remove $CO_2$ from the adsorbent. The level of $CO_2$ is lower than the partial pressure of $CO_2$ in the feed gas and preferably less than half that level. Alternatively, or in addition, the level of $CO_2$ is preferably less than 2 vol. %, more preferably less than 0.5 vol. %, most preferably less than 0.1 vol. % (1000 ppm). The single-step regeneration gas preferably consists predominantly of water (steam) and/or nitrogen. The level of steam is preferably at least 25 vol. %, preferably at least 50 vol. %, the remainder, if any, being non-acidic gases such as nitrogen, air, argon or the like.

If the regeneration and the loading are performed consecutively, i.e. in separate steps, the regeneration gas can contain similar levels of $CO_2$ as above, while the regeneration gas need not contain substantial levels of steam. Thus the regeneration gas in case of two-step regeneration, largely consists of inert, non-acidic gases such as nitrogen, air, argon or the like, and preferably less than 50 vol. % of steam, more preferably less than 25 vol. % of steam. The loading gas then preferably consists predominantly of water (steam) and/or nitrogen. The level of steam is preferably at least 25 vol. %, preferably at least 50 vol. %, the remainder, if any, being non-acidic (inert) gases such as nitrogen or the like.

The reaction stage of the process of the invention can be performed under various conditions of temperature and pressure and the like. Preferably, the reaction stage is performed at an average reactor temperature above 200° C., more preferably between 300 and 500° C., most preferably between 350 and 450° C. The pressure can be atmospheric, but is preferably super-atmospheric, in particular above 4 bar, more preferably above 10 bar, even more preferably above 15 bar, up to e.g. 80 bar, preferably up to 50 bar, most preferably up to 40 bar, e.g. 20-30 bar.

The regeneration and loading stages are preferably performed at a lower pressure than the pressure of the reaction stage. Advantageously, the pressure of the regeneration stage is less than half of the reaction stage pressure, more preferably less than ⅓ thereof. In other terms, the regeneration stage pressure is at least 2 bar, more preferably at least 5 bar, and most preferably at least 10 bar lower than the reaction stage pressure. In absolute terms, the pressure at the regeneration stage is preferably below 15 bar, more preferably below 10 bar, especially between 0 and 4 bar, for example 1 bar.

The pressure applied at the loading stage, if not carried out simultaneously with the regeneration stage, can be the same as the regeneration stage pressure. If the steam isotherm is not square or square at higher P than at the regeneration stage, the pressure may be higher than the regeneration pressure. Also, depending on the adsorption capacity and on the availability of relatively high pressure steam, the loading pressure may be higher than the regeneration pressure. In particular, for reasons of process efficiency, the loading stage is performed at a pressure of less than ⅔ of the reaction stage pressure, more preferably less than half of the reaction stage pressure. The loading stage pressure is advantageously at least 2 bar, more preferably at least 5 bar, and most preferably at least 8 bar lower than the reaction stage pressure. It may be at least 1 bar, especially at least 3 bar higher than the regeneration stage pressure. In absolute terms, the pressure at the regeneration stage is preferably below 15 bar, more preferably below 10 bar, especially between 0 and 5 bar.

Between said reaction stage (a) and said regeneration stage (b), a rinsing stage may be applied. A rinsing gas comprising $H_2O$ and/or $CO_2$ is then fed into the reactor. A rinsing step allows full displacement of $H_2$ product gas from the reactor before it is conditioned for regeneration stage, to avoid $H_2$ contamination of the $CO_2$ product, or the presence of undesired levels of CO or other components such as $CO_2$ or $H_2S$ in the $H_2$ product. Rinsing can be performed at essentially the reaction stage pressure, in which case steam is not an attractive rinsing gas from a cost point of view. $CO_2$ or nitrogen or air or mixtures $CO_2$ and nitrogen or air can then advantageously be used. In an embodiment of the invention, no rinsing is performed prior to regeneration (purging) of the adsorbent bed. In a further embodiment, rinsing may coincide with depressurisation ("blowdown") of the reactor bed to the pressure of the regeneration and/or loading stage. Alternatively, rinsing may be performed after depressuriation; in which case it is feasible to use steam or mixtures of steam with $CO_2$ or nitrogen as a rinsing gas, since lower pressure steam is less expensive than high-pressure steam. Repressurisation between the loading stage and the subsequent reaction stage can be done using any gas, including feed gas and inert gases such as nitrogen. The repressurisation gas may be fed co-current or counter-current compared to the feed direction of the feed gas into the bed. When high reaction stage pressures are used, it is advantageous to use repressurising gases having a low steam content (below 50 vol. %, especially below 25 vol. %) in order to further minimise the use of high-pressure steam.

The process of the invention can be performed in multiple reactor beds, in series or parallel. In operation, one or more beds can then be under reaction conditions, i.e. be productive, while one or more other beds are being regenerated and/or loaded at the same time, thus enhancing total efficiency. It was found that regeneration is kinetically hindered, meaning that an increased regeneration flow (and decreased time) does not lead to a proportional increase in speed of regeneration. On the contrary, a lower feed flow (with longer time) will be more efficient in regeneration, thus resulting in higher efficiency in terms of the total feed flow required per desorbed amount of $CO_2$, i.e. required amount of steam per $CO_2$. Therefore, in a particular embodiment of a multiple bed process, regeneration (purging) and/or loading is performed on two or more reactor beds in parallel, using a single regeneration (and/or loading) gas split over the reactors to be regenerated (and/or loaded) thus saving on the amount of regeneration (and/or loading) gas to be used. The optionally simultaneous reaction stage can then be performed in a single or two or more other beds. This allows an advantageous longer regeneration/loading phase than with separate regeneration/loading of single reactor beds. For example, in a parallel set of four reactor beds, regeneration/loading can be performed consecutively over the first and second bed simultaneously, then over the second and third bed simultaneously, then third and fourth, then fourth and first. etc. while at least one of the other beds is in the production mode. Similarly, the $1^{st}$, $2^{nd}$ and $3^{rd}$ bed, then the $2^{nd}$, $3^{rd}$ and $4^{th}$ bed, etc. of a multiple bed reactor unit can be in the regeneration/loading mode, while the remaining beds are in production, taking into account depressurisation and repressurisation.

Thus, the invention, in a preferred embodiment, pertains to a water gas shift process using a water shift gas reactor comprising multiple reactor beds, preferably three or more, more preferably four or more reactor beds, containing an adsorbent capable of adsorbing $H_2O$ and $CO_2$, the process comprising: (a) a reaction stage wherein a feed gas comprising CO and $H_2O$ is fed into at least one of said multiple reactor beds and wherein a product gas issuing from the reactor is collected, (b) a regeneration stage wherein $CO_2$ is removed from at least one of said multiple reactor beds, (c) a loading stage, wherein $H_2O$ is fed into at least one of said multiple reactor beds, said loading stage preferably coinciding with or alternatively following said regeneration stage (b); said loading stage (c) being performed at a pressure of less than ⅔ of the pressure of said reaction stage (a), wherein said regeneration stage and/or said loading stage are performed simultaneously in at least two of said reactor beds in parallel, while said reaction stage is performed at the same time in at least one other of said multiple beds run in parallel. The regeneration and/or loading gas fed through said at least two reactor beds being regenerated and/or loaded may preferentially be a single gas flow divided over said two or more reactor beds. Preferably the regeneration and loading stages are carried out simultaneously, i.e. as a single step, in said at least two reactor beds. The feed gas mixture preferably has a molar ratio of $H_2O$ to CO of below 2, down to 0, more preferably below 1.2, most preferably below 0.75. The further preferred process parameters, including temperatures, pressures, adsorbents, gas compositions as described herein with reference to the process of the invention can also preferably apply to the process of this multiple bed embodiment.

The adsorbent for shifting the WGS reaction towards hydrogen is a material which is capable of adsorbing both $H_2O$ and $CO_2$ and preferably also $H_2S$ and other gaseous acidic components. A suitable adsorbent comprises an alkali-promoted alumina.

The adsorbent to be used in the process of the invention is preferably an inorganic oxide, which comprises a trivalent metal oxide, in particular alumina, alumina oxide hydroxide or aluminium hydroxide. Instead or in addition to aluminium, other metals capable of adopting a trivalent state may be present, such as Fe, Mn, Cr, Ti and Zr. The adsorbent furthermore comprises one or more alkali metal oxides, hydroxides and/or carbonates. Any alkali metal can be used, including Li, Na, K, Rb and Cs. Preferred alkali metals are Na and K. The adsorbent may advantageously further comprise one or more divalent metal oxides, hydroxides or carbonates. The divalent metals can be an alkaline earth metal (Mg, Ca, Sr, Ba) or Co, Ni, Cu, Zn, Cd, Pb. Preferred divalent metals are Mg, Ca, Sr, Ba, Zn, Ni and Cu. More preferably, the adsorbent comprises calcium oxide and/or magnesium oxide and/or zinc oxide. In particular, the adsorbent has a molar (=atomic) ratio of divalent metals (especially one or more of Mg, Ca, Zn) to Al of between 0.25 and 1.5, preferably between 0.4 and 1.0 and an atomic ratio of alkali metal (especially Na and/or K) to Al of between 0.1 and 1.0, preferably between 0.25 and 0.75. Where higher WGS catalyst activity is required, the presence of zinc was found to be advantageous, for example using a Zn:Al molar ratio of 2:98 to 80:20, especially 5:95 to 60:40, within the above ratios of total divalent metals to aluminium.

Preferably, the adsorbent comprises magnesium oxide (magnesia), and has a molar (atomic) Mg to Al+Mg ratio of between 0.05 and 0.95, more preferably between 0.1 and 0.8, most preferably between 0.2 and 0.6. Where reference is made to alumina, magnesia and the like, these include the oxides, but also hydroxides and other equivalents of the oxides of aluminium, magnesium, respectively. Magnesium is particularly preferred for feed gas mixture containing significant amounts of sulphur-containing contaminants such as $H_2S$, as further detailed below, since the magnesium-based adsorbents were found to be insensitive to the sulphur compounds.

Aluminas also containing alkali metals, possibly in addition to other metals and counterions, are referred to herein as "alkali-promoted aluminas". Aluminas, also containing magnesium and/or other divalent metals, and also containing alkali metals, possibly with other metals and counterions, are referred to herein as "alkali-promoted hydrotalcites". The aluminas may be used in a manner known per se, which may comprise admixing metals oxides and further additives with the alumina or hydrotalcite or other base material in a dry state or in a solution or a slurry, and optionally drying and calcining the resulting mixture. The alumina may be any form of alumina which can be rehydrated, in particular which has a level of hydroxyl groups. Examples include gamma-alumina, boehmite, gibbsite, bayerite.

More generally, inorganic oxides which can be used as an adsorbent can be represented by the following chemical formula:

$$[Mg_{((1-x)\beta)}M^{II}_{((1-x)(1-\beta))}Al_{(\alpha x)}M^{III}_{((1-\alpha)x)}(OH)_y]$$
$$[Z^{n-}]_{((x-y+2)/n)}\cdot pH_2O \cdot qM^{I}(A^{m-})_{1/m},$$

wherein:

$M^I$ is one or more metals selected from Li, Na, K, Rb and Cs;

$M^{II}$ is one or more metals selected from Ca, Sr, Ba, Co, Ni, Cu, Zn, Cd and Pb, preferably Ni, Cu, Zn; more preferably Zn;

$M^{III}$ is one or more metals selected from Fe, Mn, Cr, Ti and Zr;

$Z^{n-}$ is one or more anions selected from halide, nitrate or acetate (n=1), or oxide, sulphate, oxalate or carbonate (n=2);

$A^{m-}$ is one or more anions selected from hydroxide (m=1) and the anions as defined for Z above, with m corresponding to n;

m and n=1 or 2 according to A and Z, respectively;

x=0.05-1, preferably 0.05-0.95, more preferably 0.20-0.90;

α=0-1, preferably 0.5-1;

β=0-1 preferably 0.25-1, more preferably 0.5-1;

p=0-15;

q=0.1-1;

y=0-4.

Where the adsorbent contains aluminium and magnesium and/or another divalent metal $M^{II}$ such as Ca or Zn, the proportion of aluminium, expressed by x in the above formula, is preferably relatively high, i.e. x=0.45-0.90, especially when high pressures (>15 bar) are applied. At low pressures, e.g. below 15 bar, in particular below 10 bar, higher $M^{II}$:Al ratios may be useful, e.g. x=0.20-0.70. At intermediate pressures, x may be e.g. 0.3-0.8. Specific examples of hydrotalcites of the above formula are referred to herein as KMG30 having an $MgO:Al_2O_3$ weight ratio of 30:70 and having the formula $[Mg_{0.35}Al_{0.65}(OH)_2][CO_3^{2-}]_{0.325}\cdot 0.5H_2O\cdot 0.32K(CO_3^{2-})_{0.5}$ with a molar ratio K:Mg:Al of about 1.0:1.1:2.0; and as KMG50 having an $MgO:Al_2O_3$ weight ratio of 50:50 with a molar ratio K:Mg:Al of about 1.0:1.7:1.4, and having the formula $[Mg_{0.55}Al_{0.45}(OH)_2][CO_3^{2-}]_{0.225}\cdot 0.5H_2O\cdot 0.32K(CO_3^{2-})_{0.5}$.

The anions in the complex metal oxides preferably comprise hydroxide and/or carbonate anions in order to ensure sufficient alkalinity for an effective adsorption of acidic gas species. In particular, at least 50% of the anions (expressed in monovalent equivalents) consist of hydroxide and/or carbonate.

Suitable inorganic oxides can have a layered structure, wherein part of the anions is arranged in layers interposed between layers containing the cations. Examples of suitable layered oxides include the hydrotalcites having proportional formulas such as $Mg_6Al_2(OH)_{16}(CO_3)\cdot 4H_2O$ or similar combinations with different Mg:Al ratios. Other suitable oxides include analogues wherein magnesium is absent (e.g. scarbroite) or is replaced by calcium (e.g. alumohydrocalcites), strontium (e.g. montroyalite) or barium (e.g. dreserrites), as well as Mg/Fe, Mg/Cr, Mg/Mn, Ni/Al etc. analogues (pyroaurite, stichtite, desautelsite, takovite).

The adsorbent preferably contains an alkali metal compound. Such alkali-containing materials are referred to also as 'alkali-promoted'. Thus, the base material of the adsorbent can be an alkali-promoted alumina. The alkali promoters may be in the form of oxides, hydroxides or, preferably carbonates. Especially, the alkali content is ≥5 wt. % calculated as alkali metal, preferably 5-30 wt. %, relative to the final mixed oxide composition.

The adsorbent may have been thermally treated, i.e. it may have been heated at a temperature above about 200° C., even more especially above about 400° C. For instance, assuming a hydrotalcite, when heating this hydrotalcite in the reactor before the WGS reaction or during the WGS reaction, the hydrotalcite modifies to a promoted alumina, such as $K_2CO_3$ and MgO promoted alumina, since at elevated temperatures, the hydrotalcites may at least partially rearrange in mixed oxides while losing hydrotalcite crystalline structure and layered double hydroxide structure. This is well known in the art and is for instance described in U.S. Pat. No. 5,358,701, U.S. Pat. No. 6,322,612 and WO 2005/102916.

Although the inorganic oxide adsorbent may advantageously be the sole adsorbent-catalyst system within the reactor, the reactor may further contain a (conventional) water gas shift catalyst, wherein preferably the weight ratio of the adsorbent to catalyst is in the range of about 2-50, such as about 5-20, especially about 10-20, or in the range of about 20-100, such as 20-50, especially about 25-50.

The process of the invention can also be used for feed gases containing, in addition to the WGS components, impurities, especially acidic impurities especially $H_2S$. Other possible acidic impurities comprise sulphur oxides, nitrogen oxides, hydrogen chloride (hydrochloric acid) and other hydrogen halides, hydrogen cyanide, and the like. Carbonyl sulphide (COS) and carbon disulphide ($CS_2$), which can be converted to $H_2S$ under conditions of adsorption and/or desorption, are considered as equivalents of $H_2S$ and are therefore also included in the term 'acidic impurities' or 'acidic components'. In this embodiment of the invention, the acidic component such as $H_2S$ is also adsorbed to the adsorbent in the reaction stage, and is selectively removed from the adsorbent in the regeneration stage or loading stage. The level of $H_2S$ or its equivalents COS and $CS_2$ in the feed gas can be between 100 and 10,000 ppm of $H_2S$. In this embodiment, the sorbent should preferably be capable of also adsorbing $H_2S$ and the like, in particular an alkali-promoted alumina, more in particular an alkali-promoted magnesium-containing alumina as defined above, e.g. with reference to the above formula:

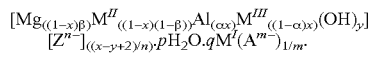

The regeneration stage then comprises a plurality of steps:
after the reaction stage wherein the adsorbent has been contacted with the feed gas containing the acidic component, a rinsing step may be applied, which ensures that a desired product such as hydrogen, is not spoilt with the acidic impurities; in such a rinsing step, the adsorbent is contacted with a rinsing gas, which does not contain high levels of $CO_2$; in particular, $CO_2$ is present at a partial pressure which is lower than the partial pressure in the feed gas; preferably, the rinsing gas is steam or nitrogen or a combination thereof, which may contain low levels of $CO_2$; the absolute pressure applied in the rising step is preferably the same as the absolute pressure of the adsorption step, or a lower pressure;
after the optional rinsing, the adsorbent can be contacted with a first purging gas; this first purging gas may contain $CO_2$ at a partial pressure which is at least the partial pressure of $CO_2$ in the feed gas;
subsequently the adsorbent is subjected to a second purging gas, which is the regeneration gas or the combined regeneration and loading gas as described above; this second purging gas may or may not contain $CO_2$ and, if so, it contains $CO_2$ at a partial pressure which is lower than the partial pressure in the feed gas.

The rinsing gas and both purging gases are essentially free of the acidic impurities, i.e. have levels of less than 50 ppm, in particular less than 5 ppm, thereof.

The first purging gas should contain a sufficient level of $CO_2$ to prevent substantial desorption of the $CO_2$ a this stage, and thus to allow a separate selective desorption. In particular the partial pressure of $CO_2$ should preferably be higher than the partial pressure in the feed gas, more preferably at least 50% higher. For example, when the feed gas contains 20 vol. % of $CO_2$, the first purging gas should contain at least 20 vol. %, preferably at least 30 vol. % of $CO_2$, if the two gases are used at the same pressure. If the feed gas contains 20 vol. % of $CO_2$ and is applied at a pressure of e.g. 20 bar, and the purging gas is applied at a pressure of 10 bar, the first purging gas should contain at least 40 vol. %, preferably at least 60 vol. % of $CO_2$. The remainder of the purging gas preferably consists of other, in particular non-acidic gases, especially nitrogen, oxygen (air, flue gas), water (steam) or methane.

The composition of the second purging gas is less critical than that of the first purging gas. However, it is preferred that the second purging gas does not contain appreciable levels of $H_2S$ and $CO_2$. The level of $CO_2$ is preferably lower than the partial pressure of $CO_2$ in the feed gas and less than half the level of $CO_2$ in the first purging gas. Alternatively, or in addition, the level of $CO_2$ is preferably less than 2 vol. %, more preferably less than 0.5 vol. %, most preferably less than 0.1 vol. %. The second purging gas preferably consists predominantly of water (steam) and/or nitrogen as described above for the regeneration gas. The second purging step can coincide with or precede the loading stage as described above. Depending on whether the second purging step (regeneration step) and the loading step coincide or not, the level of steam can be adjusted.

The various steps of the process of the invention can be carried out co-currently and counter-currently. A counter-current purging is particularly advantageous, especially in the regeneration or first purging step. Since $H_2S$ adsorption will typically occur in the upstream part of the adsorbent bed, counter-current purging will lead to a more effective and/or quicker or simpler desorption process. Another advantage is a reduced slip of $H_2S$ in the product for counter current operation. In a preferred embodiment, a counter-current purging only purges part of the adsorbent, i.e. the part which is loaded with the first acidic component ($H_2S$) which is the upstream part of the adsorption step. This can be achieved by introducing the purging gas at an intermediate point in the reactor bed or series of reactor beds, for example at between a quarter and three quarters of the length of the reactor (bed), for example halfway. This allows a reduction of the purging time and purging volume and a reduced slip of $H_2S$ into the product gas.

A pressure swing mode, i.e. a cycle comprising relatively high-pressure adsorption and relatively low-pressure desorption is also advantageous. Repressurisation can be done with pressure equalisation gas from other reactor in a different part of the pressure cycle. Such equalisation steps can be introduced to reduce pressure losses and improve product separation.

A particular embodiment of the water gas shift process of the invention uses a broader range of $H_2O$ to CO ratios and is a multi-step process. It comprises: (a) a reaction stage wherein a feed gas comprising CO and $H_2O$ is fed into a water gas shift reactor containing a sorbent material capable of adsorbing $H_2O$ and $CO_2$ and wherein a product gas issuing from the reactor is collected, (b) a regeneration stage wherein $CO_2$ is removed from the reactor, (c) a loading stage, wherein $H_2O$ is fed into the reactor, said loading stage following said regeneration stage (b); said reaction stage, regeneration stage and loading stage being performed in alternating sequence, wherein said feed gas mixture has a molar ratio of $H_2O$ to CO 0-2.0. As described above, a purging step and/or a $H_2S$ removal step may be inserted between steps (a) and (b). The process conditions as described above, also apply to this embodiment of the invention.

Thus, the process of the invention using relatively low $H_2O$ to CO ratios can be used to produce hydrogen for combustion or synthesis purposes at lower cost and higher efficiency. Surprisingly, no deposition of carbon on the adsorbent appears to occur, which would be expected in the case of using conventional WGS catalysts under high temperature conditions.

EXAMPLES

Example 1

A syngas mixture having the composition as given in Table 1 below, having varying steam contents, was subjected to adsorption in a reactor bed in a cylindrical reactor, length 10 cm, internal diameter 10 mm, containing K-promoted hydrotalcite (KMG30: Mg:Al molar ratio of about 1:2) as sieve fraction at 1 bar and 400° C. and subsequently regenerated for $CO_2$ and loaded with steam in a single step in co-current operation, at 1 bar and 400° C., with a regeneration gas having the composition as in Table 1. The results are shown in FIG. 1. The black lines represent the steam/CO molar ratio of 1/2, the lighter the lines, the higher the steam/CO molar ratios: 2/3, 1/1, 3/2. $H_2$: first to rise, highest line, CO: second to rise (breakthrough), middle line, $CO_2$: last to rise, lowest line.

- at every steam/CO ratio, there is full CO conversion and associated $H_2$ production;
- $CO_2$ response independent of steam/CO ratio;
- CO breakthrough time decreases slightly with decreasing steam/CO ratio of the feed;
- significant $H_2O$ desorption at all syngas compositions.

TABLE 1

Gas compositions of feed gas and purging gases.

|  | feed gas (vol. %) Example 1a-b-c-d | | | | regeneration (vol. %) Example 1a-b-c-d | | | |
|---|---|---|---|---|---|---|---|---|
| $H_2O$ | 26 | 17 | 11 | 8.6 | 26 | 17 | 11 | 8.6 |
| He | 31 | 40 | 46 | 49 | 31 | 40 | 46 | 49 |
| $CO_2$ |  | 13 |  |  |  | 0 |  |  |
| CO |  | 17 |  |  |  | 0 |  |  |
| $H_2$ |  | 13 |  |  |  | 0 |  |  |
| Ar |  | 0 |  |  |  | 43 |  |  |
| $H_2O$/CO ratio | 3/2 | 1/1 | 2/3 | 1/2 |  |  |  |  |

Example 2

Figure 2:
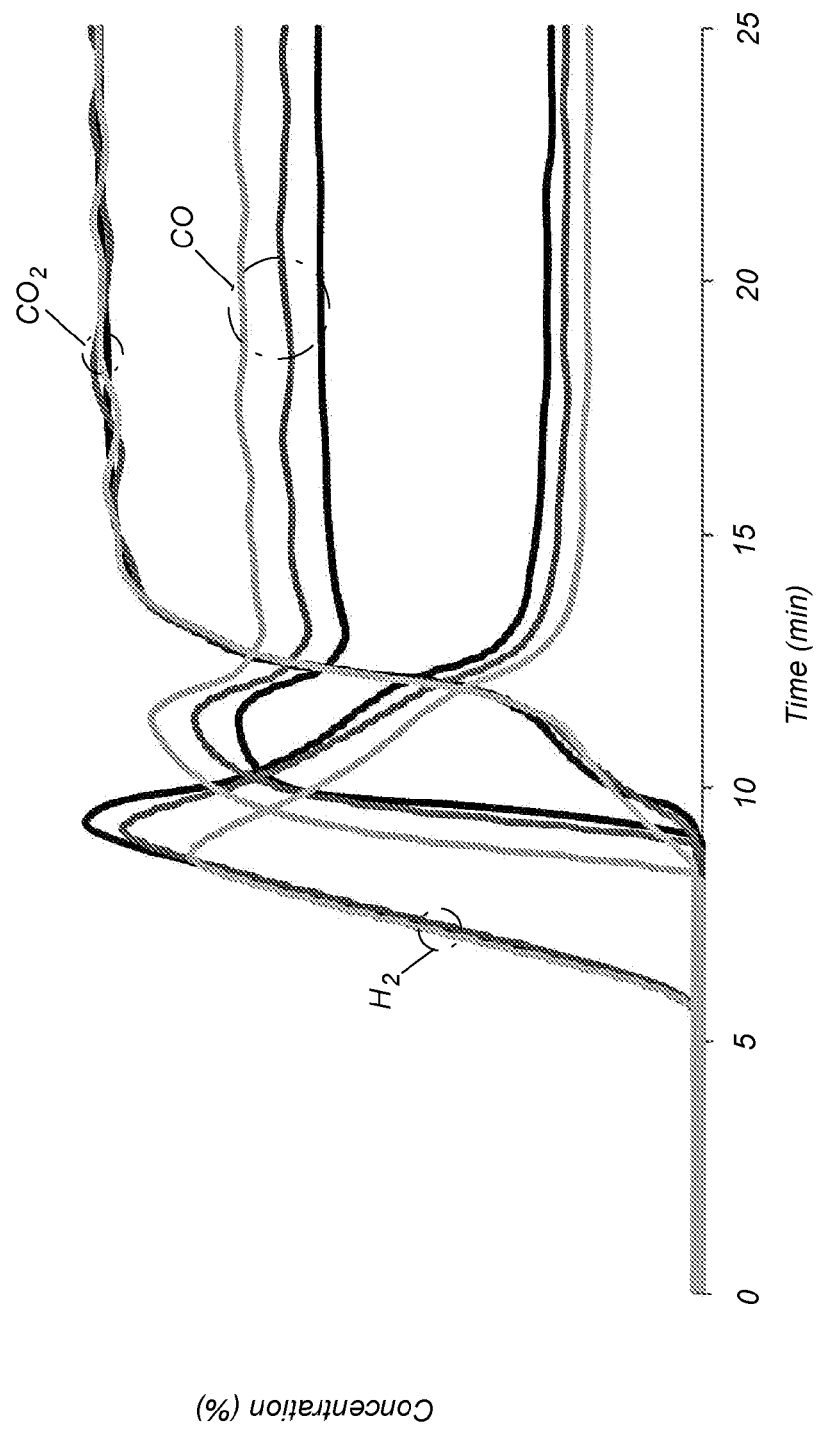
FIG. 2 shows a gas mixture having the composition as given in Table 2. The black lines represent the steam/CO molar ratio of 1.5, the dark grey lines steam/CO=0.95, and the light grey lines steam/CO=0.65. H2: first to rise, lower line after 12 min., CO: second to rise (breakthrough), middle line after 12 min., CO2: last to rise, highest after 12 min.

A gas mixture having the composition as given in Table 2 below, having varying steam contents, was subjected to adsorption in a reactor bed (reactor type as in Example 1) containing K-promoted hydrotalcite (KMG30) as sieve fraction, at 20 bar and 400° C. for 30 minutes and subsequently regenerated for $CO_2$ and loaded with steam in a single step in co-current operation, at 1 bar and 400° C. for 45 minutes, with a regeneration gas having the composition as given in Table 2. The results are shown in FIG. 2. The black lines represent the steam/CO molar ratio of 1.5, the dark grey lines steam/CO=0.95, and the light grey lines steam/CO=0.65. $H_2$: first to rise, lower line after 12 min., CO: second to rise (breakthrough), middle line after 12 min., $CO_2$: last to rise, highest after 12 min.

- At every steam/CO ratio, there is full CO conversion and associated $H_2$ production,
- $CO_2$ response independent of steam/CO ratio,
- CO breakthrough time decreases slightly with lower steam/CO ratio.

TABLE 2

Gas compositions of feed gas and purging gases.

|  | feed gas (vol. %) Example 2a-b-c | | | regeneration (vol. %) Example 2a-b-c | | |
|---|---|---|---|---|---|---|
| $H_2O$ | 25 | 16 | 11 | 26 | 16 | 11 |
| $N_2$ + inert | 46 | 55 | 60 | 74 | 84 | 89 |
| $CO_2$ |  | 12 |  |  | 0 |  |
| CO |  | 17 |  |  | 0 |  |
| $H_2$ |  | 0 |  |  | 0 |  |
| $H_2O$:CO ratio | 1.5 | 0.95 | 0.65 |  |  |  |

Example 3

Figure 3:
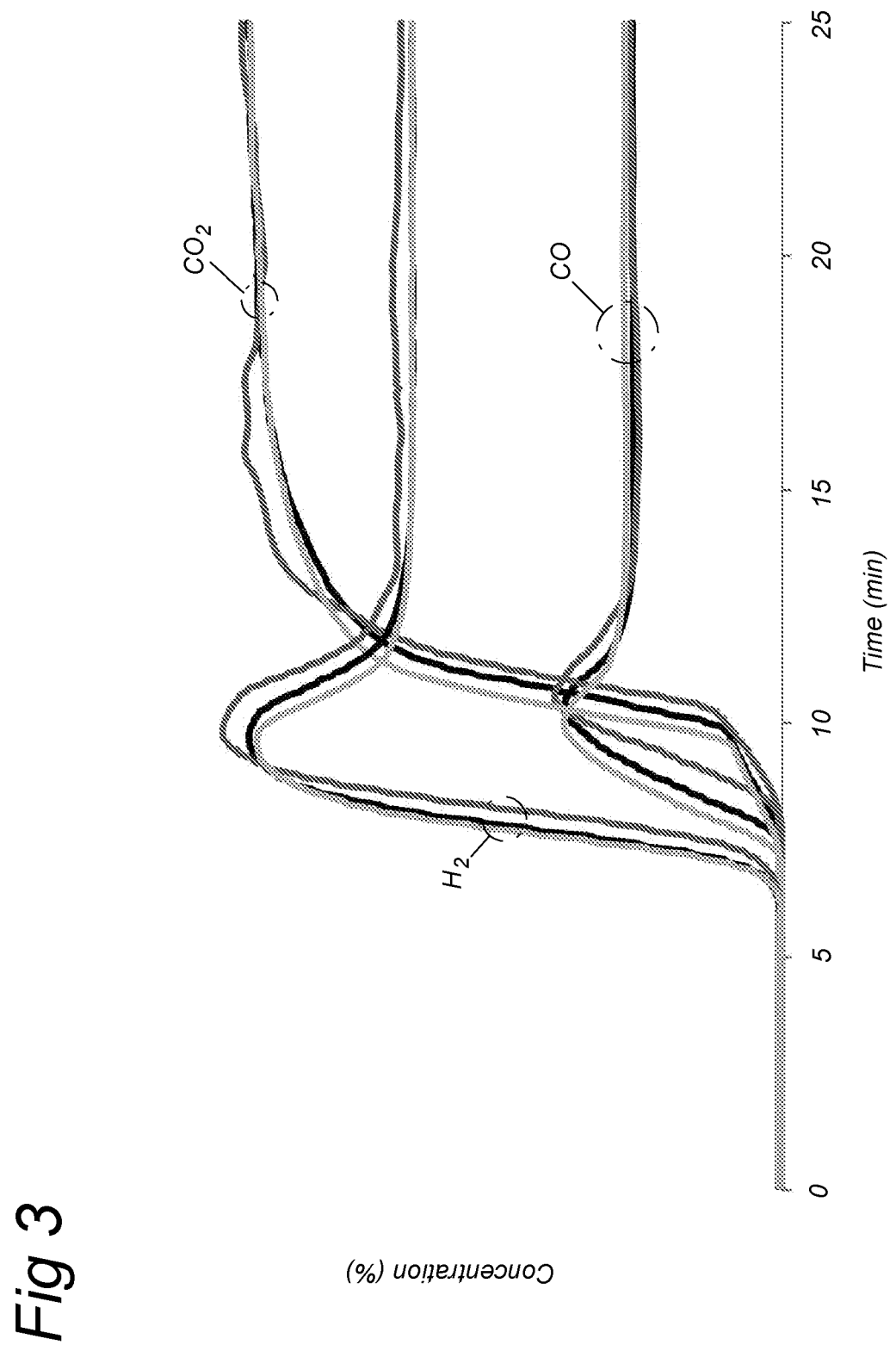
FIG. 3 shows a gas mixture having the composition as given in Table 3. The black lines represent the steam/CO molar ratio of 3.0, the dark grey lines steam/CO=1.7, and the light grey lines steam/CO=1.03. H2: first to rise, middle line after 11 min., CO: second to rise (breakthrough), lower line after 10 min., CO2: last to rise, highest after 11 min.

A gas mixture having the composition as given in Table 3 below, having varying steam contents, was subjected to adsorption in a reactor bed containing K-promoted hydrotalcite (KMG50, having an MgAl molar ratio of 0.55:0.45), at 20 bar and 400° C. for 30 minutes and subsequently regenerated for $CO_2$ and loaded with steam in a single step in co-current operation, at 1 bar and 400° C. for 45 minutes, with a regeneration gas having the composition as given in Table 3. The results are shown in FIG. 3: The black lines represent the steam/CO molar ratio of 3.0, the dark grey lines steam/CO=1.7, and the light grey lines steam/CO=1.03. $H_2$: first to rise, middle line after 11 min., CO: second to rise (breakthrough), lower line after 10 min., $CO_2$: last to rise, highest after 11 min.

TABLE 3

Gas compositions of feed gas and purging gases.

|  | feed gas (vol. %) Example 3a-b-c | | | regeneration (vol. %) Example 3a-b-c | | |
|---|---|---|---|---|---|---|
| $H_2O$ | 26 | 17 | 11 | 25 | 16 | 11 |
| $H_2$ + inert | 43 | 47 | 50 | 75 | 84 | 89 |
| $CO_2$ | 23 | 26 | 28 |  | 0 |  |
| CO | 8.5 | 9.4 | 10.3 |  | 0 |  |
| $N_2$ |  | 0 |  |  | 0 |  |
| $H_2O$:CO ratio | 3.0 | 1.9 | 1.1 |  |  |  |

- At every steam/CO ratio, there is full CO conversion and associated $H_2$ production;
- $CO_2$ response independent of steam/CO ratio;
- CO breakthrough time decreases slightly with lower steam/CO ratio.

Example 4

Figure 4:
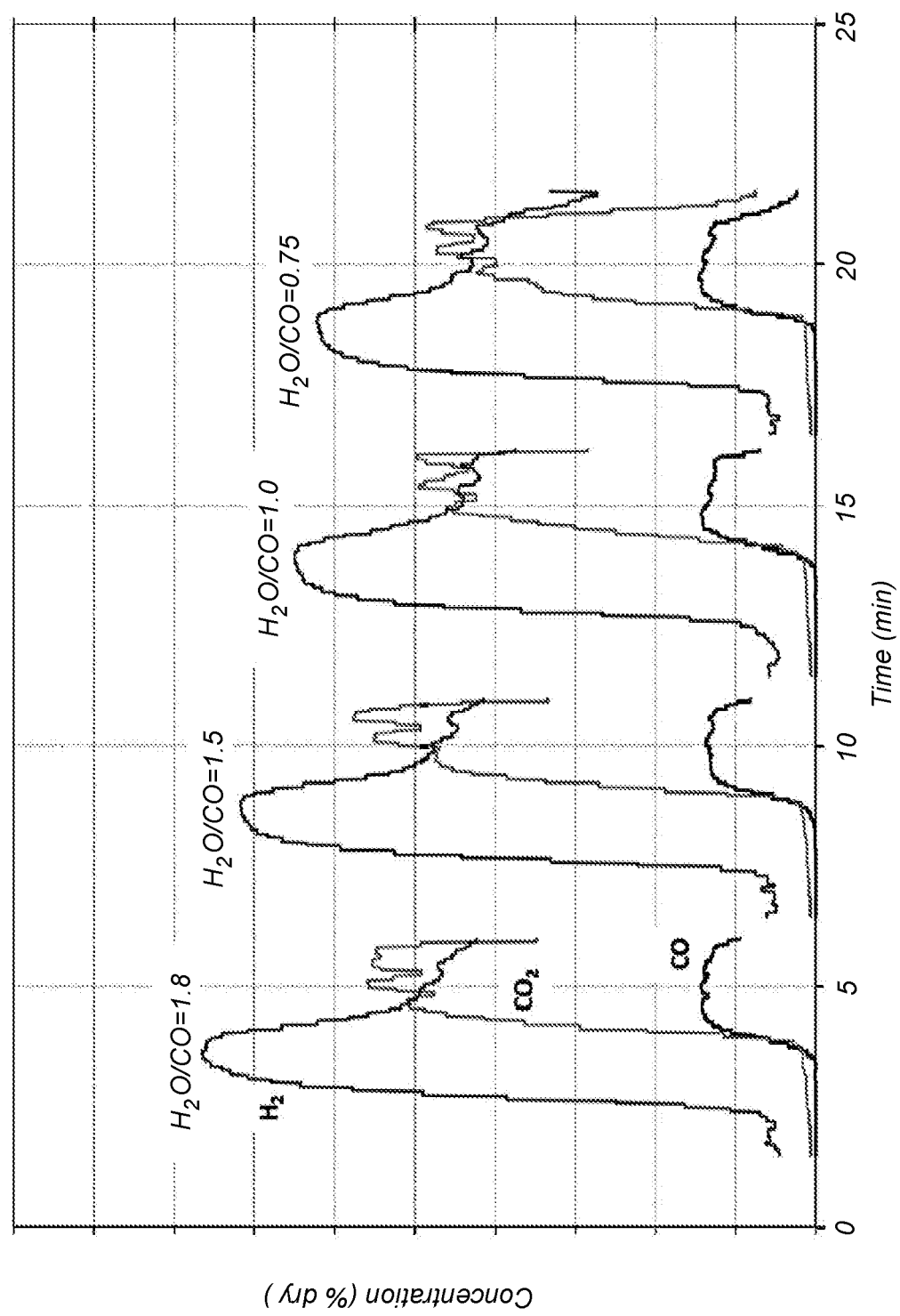
FIG. 4 shows the results of a gas mixture having varying steam contents being subjected to adsorption in a cylindrical reactor containing K-promoted hydrotalcite (KMG30) in pressure swing adsorption (PSA) with full loading of CO2 (break through mode).

A gas mixture having the composition as given in Table 4 below, having varying steam contents, was subjected to adsorption in a cylindrical reactor, length 2 m, internal diameter 38 mm, containing K-promoted hydrotalcite (KMG30), at 28 bar and 400° C. in pressure swing adsorption (PSA) with full loading of $CO_2$ (break through mode). Purging at 1.5 bar and repressurisation were done using 60% steam (see Table 4). The results are shown in FIG. 4. At every steam/CO ratio, there is always a period of 100% CO conversion prior to breakthrough.

TABLE 4

Gas compositions of feed gas and purging gases

|  | feed gas (vol. %) Example 4a-b-c-d and 5a-b-c-d | | | | purge gas (vol. %) Examples 4a-b-c-d | repressurising gas (vol. %) Examples 4a-b-c-d | purge gas (vol. %) Examples 5a-b-c-d | repressurising gas (vol. %) Examples 5a-b-c-d |
|---|---|---|---|---|---|---|---|---|
| $H_2O$ | 23 | 19 | 13 | 9 | 60 | 60 | 100 | 0 |
| $N_2$ + inert | 6 | 10 | 16 | 19 | 40 | 40 | 0 | 100 |
| $CO_2$ |  | 19 |  |  | 0 | 0 | 0 | 0 |
| CO |  | 13 |  |  | 0 | 0 | 0 | 0 |
| $H_2$ |  | 40 |  |  | 0 | 0 | 0 | 0 |
| $H_2O$:CO ratio | 1.8 | 1.5 | 1.0 | 0.7 | — | — | — | — |

Example 5

Figure 5:
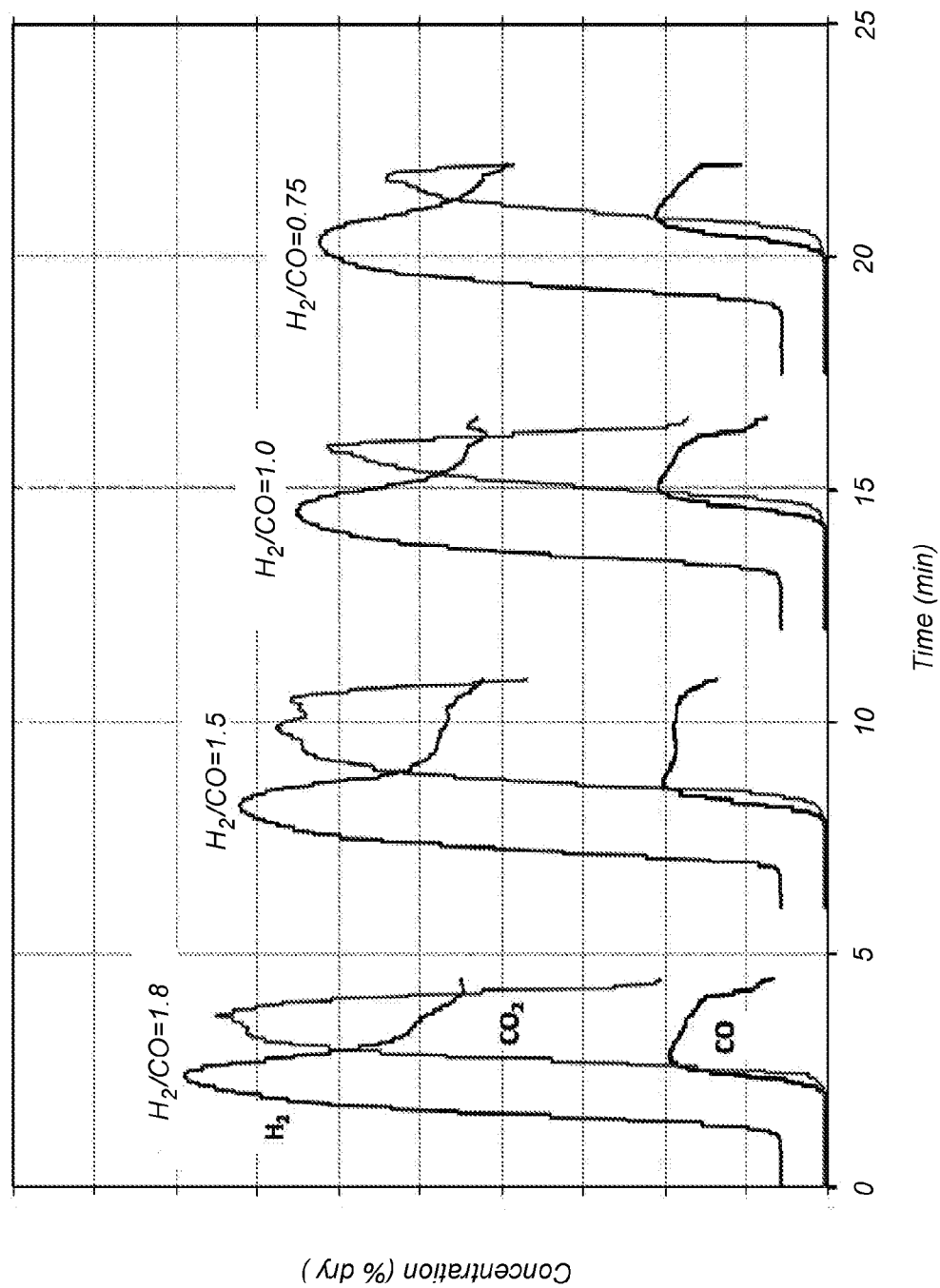
FIG. 5 shows the results of Table 4 using 100% steam for purging and dry nitrogen for repressurisation, instead of steam/nitrogen $^{60}/_{40}$ for both.

Example 4 was repeated, using 100% steam for purging and dry nitrogen for repressurisation, instead of steam/nitrogen 60/40 for both (see Table 4). The results are shown in FIG. 5. At every steam/CO ratio, there is always a period of 100% CO conversion prior to breakthrough. CO breakthrough is slightly earlier than $CO_2$ breakthrough.

Example 6

Figure 6:
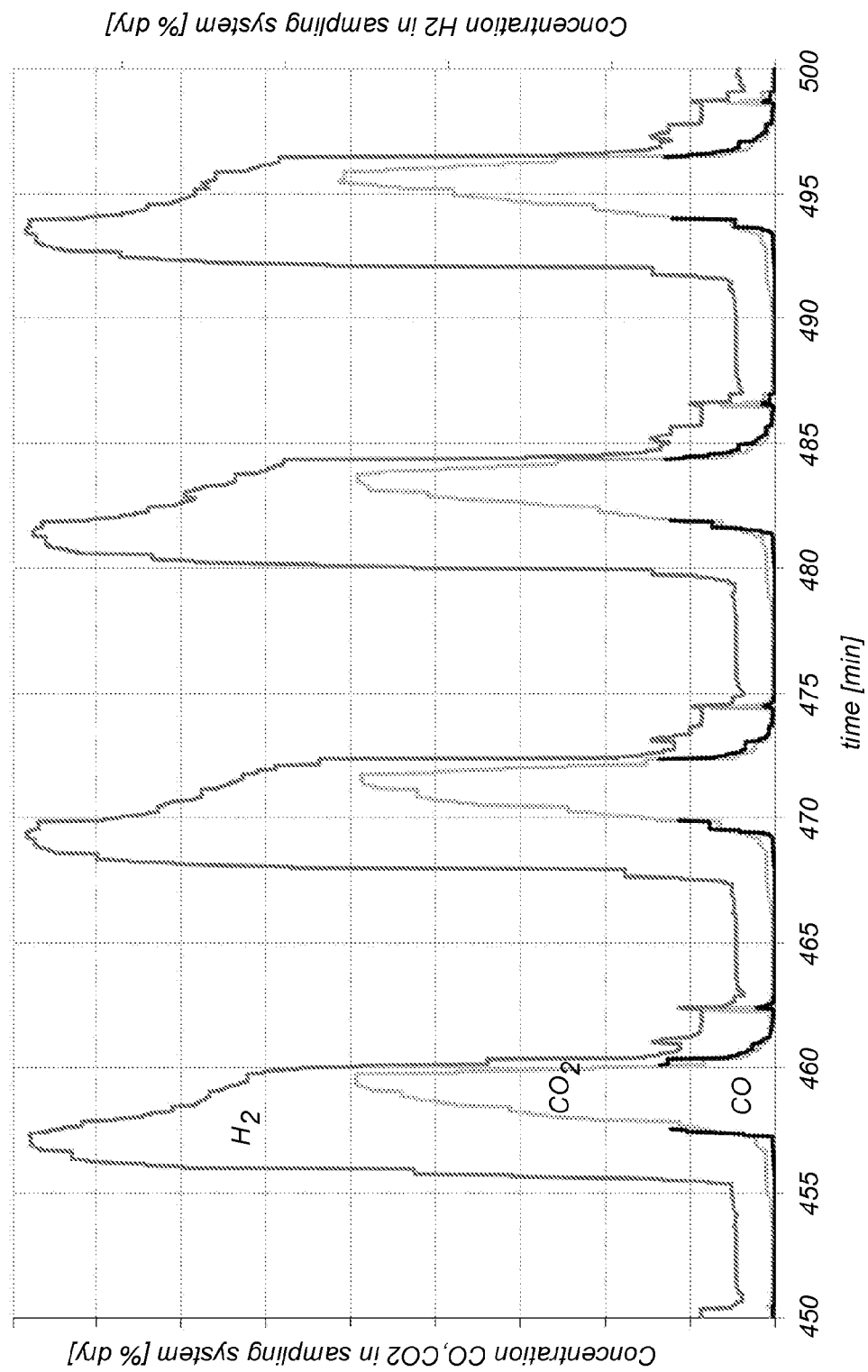
FIG. 6 shows a dry feed gas mixture (steam/CO molar ratio=0) having the composition as given in Table 5. The black line represents the CO concentration, the representation of which is cut off above 10-15% dry in order to show the CO2 concentration line (light grey).

A dry feed gas mixture (steam/CO molar ratio=0) having the composition as given in Table 5 below, was subjected to adsorption in a cylindrical reactor, length 2 m, internal diameter 38 mm, containing K-promoted hydrotalcite (KMG30), at 28 bar and 400° C. in pressure swing adsorption (PSA) with full loading of $CO_2$ (breakthrough mode) in a counter-current mode. After depressurisation, purging at 1.5 bar and repressurisation were done using 100% $N_2$ (see Table 5). No rinse was done prior to regeneration. The results are shown in FIG. 6. The black line represents the CO concentration, the representation of which is cut off above 10-15% dry in order to show the $CO_2$ concentration line (light grey). It follows that even without steam in the feed, there is still full CO conversion prior to breakthrough with associated $H_2$ production. The sorbent $CO_2$ capacity increases by roughly 15%. There is basically simultaneous breakthrough of CO and $CO_2$.

TABLE 5

Gas compositions of feed gas and purging gases

| Example 6a | feed gas (vol. %) | purge gas (vol. %) | repressurising gas (vol. %) |
|---|---|---|---|
| $H_2O$ | 0 | 100 | 0 |
| $CO_2$ | 15 | 0 | 0 |
| CO | 13 | 0 | 0 |
| $H_2$ | 30 | 0 | 0 |
| $N_2$ | 42 | 0 | 100 |
| $H_2O$:CO ratio | 0 | | |

The invention claimed is:

1. A water gas shift process comprising:
   (a) feeding a feed gas comprising CO and $H_2O$ into a water gas shift reactor containing a sorbent material capable of adsorbing $H_2O$ and $CO_2$ and collecting a product gas issuing from the reactor,
   (b) removing $CO_2$ from the reactor, and
   (c) feeding $H_2O$ into the reactor, wherein:
   step (c) coincides with or follows step (b);
   step (c) is performed at a pressure of less than ⅔ of the pressure of step (a),
   all the steps are performed in alternating sequence, and
   the feed gas mixture has a molar ratio of $H_2O$ to CO of below 1.2.

2. The process according to claim 1, wherein step (a) is performed at a pressure between 4 and 80 bar.

3. The process according to claim 2, wherein step (a) is performed at a pressure between 10 and 40 bar.

4. The process according to claim 1, wherein step (b) is performed at a pressure less than half of that of step (a).

5. The process according to claim 1, wherein step (b) is performed at a pressure between 0 and 4 bar.

6. The process according to claim 1, wherein step (b) and step (c) are performed simultaneously using a gas containing at least 50 vol. % of steam, after depressurisation.

7. The process according to claim 1, wherein the step (c) is performed following step (b), and step (c) is performed at a pressure which is higher than the pressure of step (b).

8. The process according to claim 7, wherein step (b) is performed using a gas containing less than 50 vol. % of steam.

9. The process according to claim 1, wherein step (a) is performed at an average reactor temperature of between 300 and 500° C.

10. The process according to claim 1, wherein the adsorbent comprises an alkali-promoted alumina.

11. The process according to claim 1, wherein the adsorbent comprises calcium oxide and/or magnesium oxide and/or zinc oxide.

12. The process according to claim 10, wherein the adsorbent has an atomic ratio of (Mg+Ca+Zn) to Al of between 0.25 and 1.5, and an atomic ratio of alkali metal to Al of between 0.1 and 1.0.

13. The process according to claim 10, wherein the adsorbent has an atomic ratio of (Mg+Ca+Zn) to Al of between 0.4 and 1.0, and an atomic ratio of alkali metal to Al of between 0.25 and 0.75.

14. The process according to claim 1, wherein the feed gas further comprises between 100 and 10,000 ppm of $H_2S$.

15. The process according to claim 1, further comprising, between steps (a) and (b), feeding a purging gas comprising $CO_2$ into the reactor.

16. The process according to claim 1, wherein the feed gas mixture has a molar ratio of $H_2O$ to CO of 0-0.75, and a CO concentration in the feed gas of at least 10%.

17. The process according to claim 1, wherein the feed gas issues from a preceding water gas shift reaction.

18. The process according to claim 1, wherein the product gas is used for combustion, and the feed gas mixture has a molar ratio of $H_2O$ to CO of 0.5-1.2.

19. The process according to claim 1, wherein the product gas is used for producing chemicals, and the feed gas mixture has a molar ratio of $H_2O$ to CO of below 0.8.

20. A water gas shift process comprising: (a) reacting a feed gas comprising CO and $H_2O$ in a water gas shift reactor containing a sorbent material capable of adsorbing $H_2O$ and $CO_2$ and collecting a product gas issuing from the reactor, (b) removing $CO_2$ from the reactor, and (c) loading $H_2O$ into the reactor, wherein the loading step follows the removing step; all of the steps are performed in alternating sequence, the loading step is performed at a pressure of less than ⅔ of that of the reaction step, and the feed gas mixture has a molar ratio of $H_2O$ to CO 0-2.0.

* * * * *